June 23, 1931. O. V. MARTIN 1,811,091
APPARATUS FOR THE PRODUCTION OF SALTS FROM BRINES AND SOLUTIONS
Original Filed May 19, 1926 4 Sheets-Sheet 4
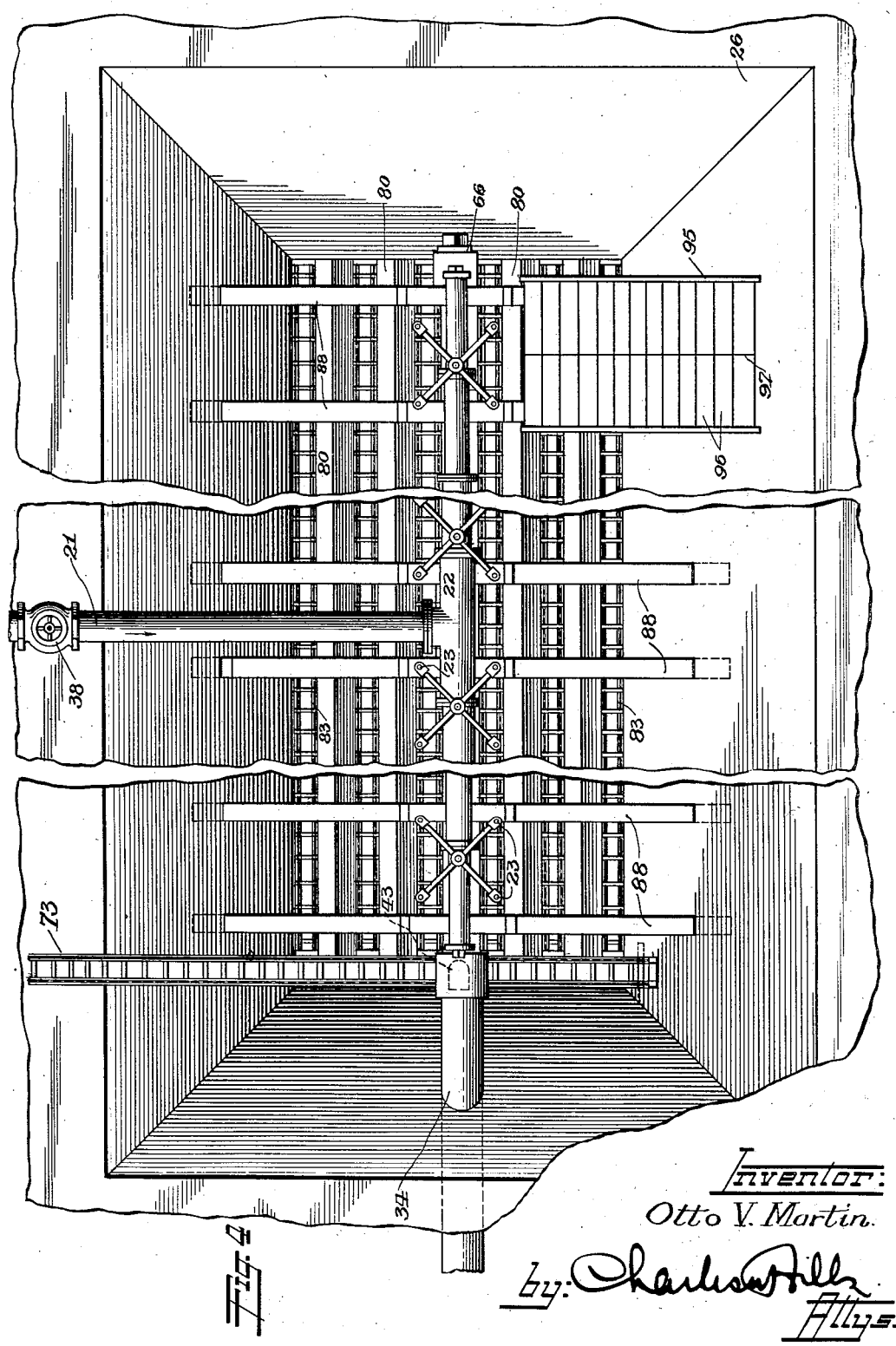
Inventor:
Otto V. Martin.

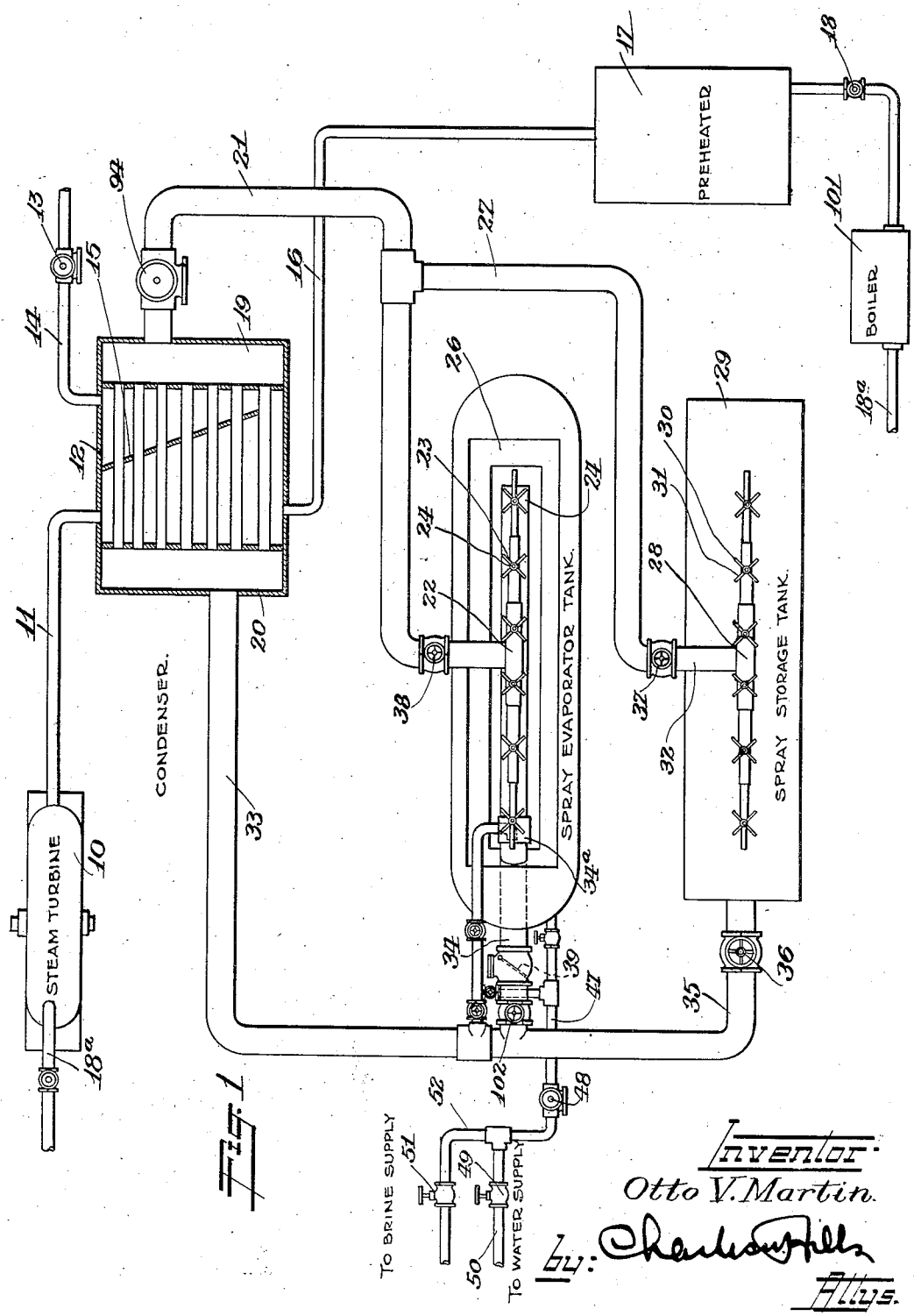

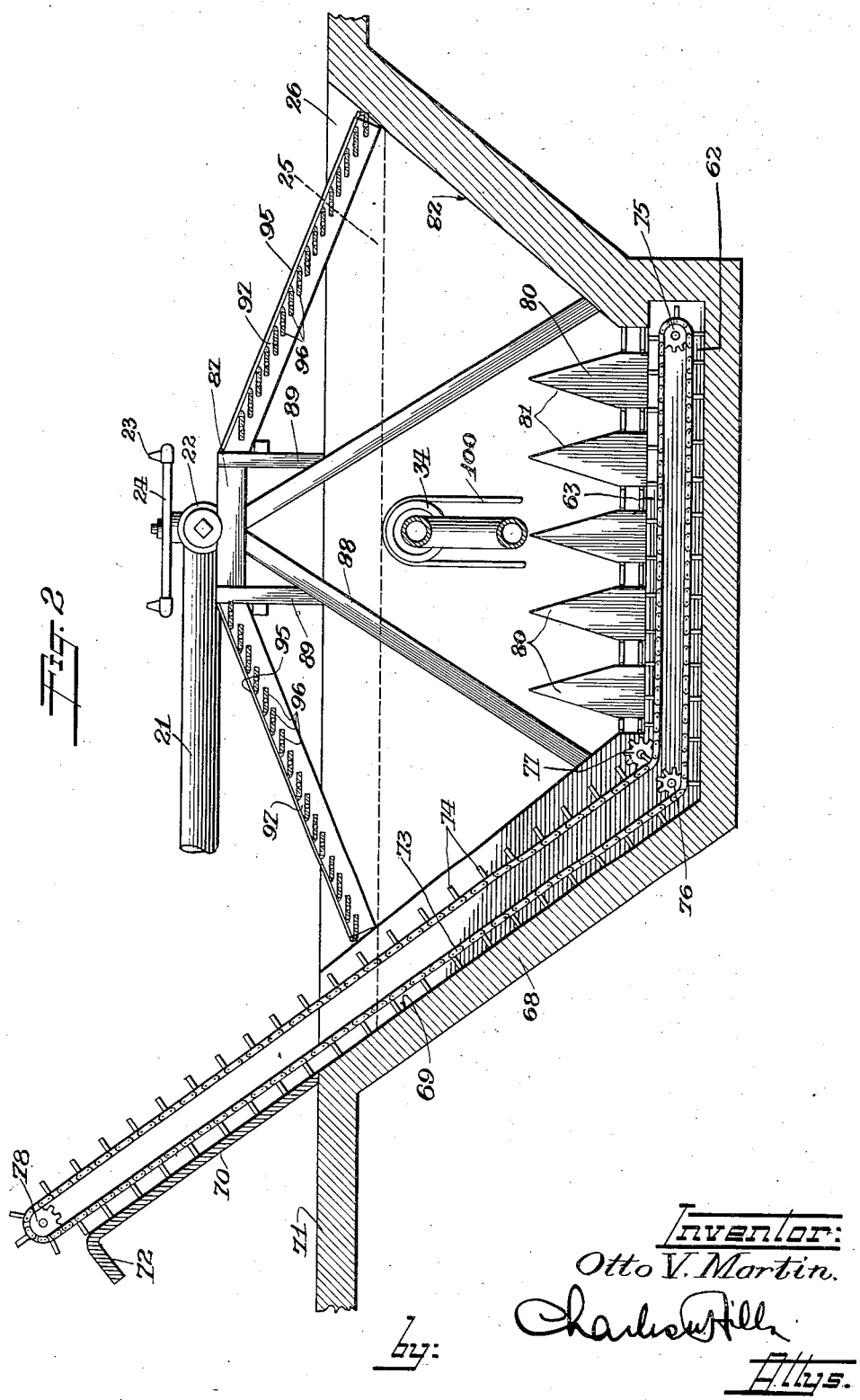

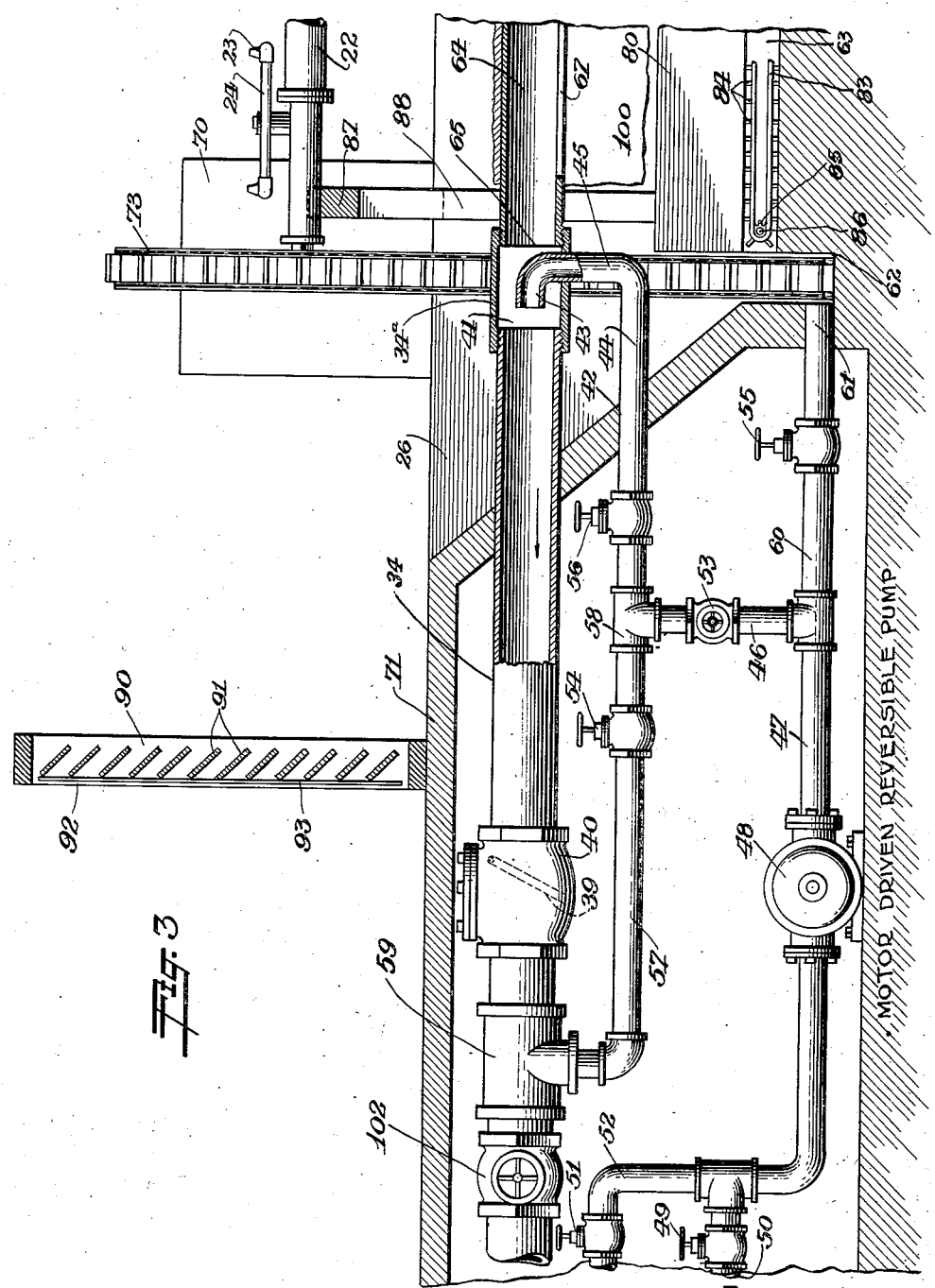

Patented June 23, 1931

1,811,091

UNITED STATES PATENT OFFICE

OTTO V. MARTIN, OF SAND SPRINGS, OKLAHOMA, ASSIGNOR, BY MESNE ASSIGNMENTS, TO TEXACO SALT PRODUCTS COMPANY, OF NEW YORK, N. Y., A CORPORATION OF DELAWARE

APPARATUS FOR THE PRODUCTION OF SALTS FROM BRINES AND SOLUTIONS

Original application filed May 19, 1926, Serial No. 110,219, now Patent No. 1,657,633, dated January 31, 1928. Divided and this application filed October 22, 1927. Serial No. 227,912.

This invention relates to apparatus for manufacturing salts from brines and solutions.

In my copending application entitled: "Process for the production of salts from brines and solutions," Serial No. 110,219, filed May 19, 1926, which has matured into Patent Number 1,657,633, dated January 31, 1928, I have disclosed the apparatus described and claimed herein in connection with my process. The present application, therefore, constitutes a division of said copending application.

It is an object of this invention to provide an apparatus suitable for use in connection with my process for recovering salts from solutions, such apparatus including a heat transfer device, whereby the latent heat of a condensing fluid passing through the device may be utilized to increase the temperature of the salt solution, and a second device for receiving the heated solution adapted to effect cooling of the solution by evaporation under atmospheric conditions.

It is a further object of this invention to provide apparatus to be used in connection with the usual forms of surface condensers as found in power plants and the like for utilizing the waste heat dissipated in the surface condenser to raise the temperature of a salt solution sufficiently above atmospheric temperatures that concentration of the salt solution may be subsequently effected in apparatus adapted to effect cooling of the solution by evaporation.

This invention will be best understood from a consideration of the following detailed description, in view of the accompanying drawings forming a part of the specification; nevertheless it is to be understood that the invention is not confined to the specific embodiment disclosed, being susceptible of such changes and modifications which shall define no material departure from the salient features of the invention as expressed in the appended claims.

In the drawings:

Figure 1 shows more or less diagrammatically an arrangement for carrying out my process.

Figure 2 is a transverse vertical section of the open evaporating brine tank employed in the arrangement.

Figure 3 is a fragmentary longitudinal section of a portion of the tank showing the construction of the piping for withdrawing brine from the tank.

Figure 4 is a plan view of the open brine tank.

Referring more particularly to the drawings, 10 designates a steam turbine which may be of the Allis-Chalmers type connected by means of a pipe 11 with a surface condenser 12. This condenser is connected with a vacuum pump 13 which is connected by means of a pipe 14 with the surface condenser and a baffle 15 prevents the loss of steam from the condenser. A pipe 16 connects the surface condenser with a preheater 17 while a pipe 18 is connected with the boiler which creates steam for the turbine 10 so that water at approximately 212° F. is returned to the boiler for further production of steam.

The surface condenser is provided with heads 19 and 20. A conduit 21 connects the head 19 with a spray manifold 22. The latter, upon opposite sides of its connection with the conduit 21 is gradually reduced in diameter towards its outer free ends which provides for an equalization of the pressure when brines or solutions are forced through the nozzles 23 of the spray arms 24 so that all of the nozzles 23 will be operated under the same pressure and force the solution from said nozzles in a mist to the same height over the level 25 of the liquid in the open tank 26.

A branch pipe 27 is connected with the supply pipe 21 and supplies heated brine to another spray manifold 28 which extends longitudinally of a square flat pond or open tank 29. This tank has a plurality of spray nozzles 30 connected with arms 31, with the arms placed in groups and provided at spaced intervals along the manifold 28. This manifold is likewise decreased in diameter from opposite sides of the connections 32 so that all of the nozzles will be supplied with a predetermined pressure and that the mist coming from said nozzles will be projected from the same at substantially the same angle and to substantially the same distance from said nozzles. A return pipe 33 is connected by means of a pipe 34 with a tank 26 and by means of a pipe 35 with tank 29. A valve 36 controls the discharge through pipe 35 while a valve 37 controls the admission of brine to the tank 29. A valve 38 controls the flow of the brine solution to the tank 26.

The pipe 34 has a check valve 39 formed in a casing 40, which permits the flow of brine from the tank 26 to the condenser 12 but prevents the return of the brine to said tank. It will be seen from Figure 3 that pipe 34 terminates at 41 adjacent the inclined end wall 42 of the tank. Adjacent the end 41 of the pipe 34 is disposed an open end 43 of a pipe 44. This pipe is turned upwardly as shown at 45 and is connected by means of a pipe 46 with a pipe 47. A motor driven reversible pump 48 is interposed in the line 47 for the purpose which will be presently explained. However, when the valve 49 in the supply pipe 50 is closed and valve 51 in pipe 52 is opened the pump may force brine intermittently or continuously through pipe 47, pipe 46 and pipe 44 into the pipe 34. At this time valves 54 and 55 are closed while valve 56 is open.

A pipe 57 is connected at one end with a T 58, while the other end is connected to a T 59 of the pipe 34 so that fresh brine from pipe 52 or water from pipe 50 may be supplied directly to pipe 34 upon one side of the valve 39. The pipe line 57 and the check valve 39 permit priming of the system.

A pipe 60 has an end 61 terminating within the wall 42 of the tank 26 and at the bottom of a transverse channel 62 formed at one end of the tank 26 and below the level of the channels 63 which extend longitudinally of the tank.

A pipe 64 extends substantially the entire length of the tank 26 and has one end in communication with pipe 34 and the other end, as shown at 66, (Fig. 4) closed. A slit 67 extends substantially the length of the pipe 64 and the brine or solution in the tank 26 is drawn through the slitted portion by the suction in the pipe 34. The connection 34a between pipes 34 and 64 is provided with an opening into which the bent portion 45 is inserted so that the open end or nozzle portion 43 is directed towards the pipe 34. The pipe 34 and pipe 64 may be a single pipe.

The channel 62 extends not only transversely of the tank 26 but upwardly through a side wall 68 as shown at 69 which is extended at 70 above a floor space 71 which embraces the periphery of the upper open end of the tank 26. The upper free end of the extension 70 is turned downwardly as shown at 72 so that the crystals which are carried up by the travelling carrier 73 through the blades 74 are deposited upon the slide 72 whence the crystals may be collected. The carrier 73 extends longitudinally of the transverse channel 62 and also of the channel 69. A sprocket 75 mounted in the inner end of the channel 62 supports the carrier at that point. Sprockets 76 and 77 maintain the carrier in proper position while a sprocket 78 disposed at any point above the floor 71 not only serves to support the carrier at this point but also drives the carrier.

The bottom of the tank 26 may be provided with a single longitudinal groove or a plurality of parallel longitudinal grooves 63 separated by walls 80 which are triangular shaped in cross section, these walls having their sides 81 inclined as are the side walls 82 of the tank 26. In each of the longitudinal grooves 63 are disposed travelling carriers 83 having fins or scrapers 84 which drag across the bottom of the groove and are supported by sprockets 85 at the opposite ends of said grooves. The sprockets 85 are positively driven and are all placed upon the same shaft 86 which is in turn driven through a chain (not shown) and connected with the driving mechanism of the sprocket 78 so that all of the travelling carriers are driven synchronously. As the travelling carriers 83 are operated in the grooves 63 all crystallized substances are forced from the grooves 63 into the channel 62 whence the travelling carrier 73 carries the crystals outwardly and deposits them upon the discharging shelf 72. (Figure 2.)

The manifolds 22 and 28 are supported by means of an arrangement shown in end view in Figure 2 in which a plurality of transverse bars 87 are carried in any suitable manner, for example, by diagonally disposed standards, the latter being braced by cleats 89 secured to the ends of the bars 87 and to the standards 88. The lower ends of the standards are secured in the side walls 82 of the tank 26. The bars 87 may be grooved properly to support the respective manifolds.

Since the brines or solutions are sprayed to the open air it is necessary to control natural wind currents which will not only affect the deposition of the spray over the pond but will also affect the rate of evaporation. In order to accomplish this control I have provided a plurality of frames 90 arranged along one side of the tank 26 and supported on the floor or platform 71 or the frames may be arranged entirely around the periphery of said tank. In each of the frames is disposed a plurality of movable shutters or slats 91 which are connected together by means of cables or rods 92 for operating the shutters so that the openings between the same may be increased or decreased. Means is provided (not shown) for maintaining the shutters in adjusted position. Each of the shutters is pivotally mounted for rocking movement in the side bars 93 of the frames.

A plurality of frames 95 are disposed above the normal liquid level in the evaporating tank 26, being supported preferably in downwardly inclined positions on both sides of the manifold 22. These frames include a plurality of pivotally mounted slats 96 which are connected together by a cord or cable 97 so that the slats may be arranged in any angular relation with respect to the horizontal for checking the fall of the spray as it issues from the nozzles 23. It will be noted that the slats 96 are arranged in an overlapping stair-step or cascade effect so that the mist starting at the uppermost slat will travel downwardly from slat to slat and is finally discharged into the tank along the side walls. This aids in maintaining the surface of the liquid in the tank free from agitation whereby the larger crystals are formed. By the alteration of the position of the slats, the cascade effect of the progression of the brine will be changed into a series of short discharges of the brine from each individual slat or the slats may be so positioned that the mist will fall directly through the slats upon the surface of the liquid so that the amount of agitation caused by the falling of the brine may be controlled to any degree desired, with a consequent control of the size of the crystals.

An apron 100 of suitable fabric or the like is draped over the pipe 34 upon opposite sides of the slit 67 so that this pipe may be protected from the path of travel of the settling crystals and prevent the formation of the crystals along the pipe and thus prevent the clogging of the pipe and the slit 67.

In carrying out my process of obtaining crystals the tank 26 is filled with a predetermined quantity of a solution or brine through the supply pipe 52 and pipe 47 and the solution may be fed into the tank either by gravity or by means of a pump 48 which is operated by an electric motor or any other form of motor suitable for the purpose. At this time valves 49 and 53 are closed, while valve 55 is open. A predetermined level of brine is maintained in the tank 26 for controlling the size of the crystals which are formed by the concentration or saturation of the brine. The pump 94 is then operated and may be driven through operative connections with the steam turbine or by means of a motor from the current of the power house in which the steam turbine is located for operating the generator. This pump promotes the circulation of the brine or solution between the tank 26 and the surface condenser 12. The pump creates a suction on pipe 34 and the brine flows through the open end 41 of said pipe and where said pipe projects into the tank 26. The flow of brine through the end 41 of pipe 34 causes the brine in pipe 64 to likewise move past the open end 65 of pipe 64 with the fluid passing through the slit 67 of said pipe. In order to prevent the formation of crystals in the pipes 34 the valves 55, 54 and 49 are maintained closed and valves 51, 53 and 56 are opened and the pump 48 is operated so that the solution or brine is pumped through pipe 44, 45 and through the open end 43 and into the pipe 41. This unsaturated brine passing through the pipe dissolves or prevents the formation of crystals all along the line and through pipe 34, 33 and through the surface condenser 12 and pipe 21 back to pipe 22. The check valve 39 in the casing 40 permits the discharge of the fluid from the tank 26 but prevents its return.

As the fluids pass through the surface condenser 12 which is connected with the steam turbine the solutions absorb heat while passing through the condenser so that the temperature of the brine or solution is raised slightly above atmospheric dew point temperature and under normal conditions this may be approximately 10 to 15 degrees. It will be appreciated, however, that due to variations of the temperature at different seasons of the year the rise in temperature above atmosphere will be considerably greater than 10 or 15 degrees. It will be appreciated that the raising of the temperature of one pound of water from approximately 80° F. to 212° F. will require 132 B. t. u.'s while in converting the water to steam and in which it is necessary to overcome the cohesion of the molecules, and external pressure, 970 B. t. u.'s or the heat of vaporization is required. It will be seen that a greater percentage of heat units is required in converting the water at 212° F. to steam at 212° F. However, only 158 B. t. u.'s are required for raising the temperature of the steam 158° F. A careful consideration of this condition reveals the fact that 290 B. t. u.'s only are required to raise the temperature of the fluid from 80° to 370° F. while 854 B. t. u.'s are required for converting the water into steam at the same temperature.

It is an important feature of the present invention that the enormous quantity of B. t. u.'s which represent the latent heat of the steam is utilized for raising the temperature of the brine a predetermined degree; so that, when the brine is sprayed as a mist into the atmosphere, condensation and evaporation take place at a very rapid rate so that the brine is rapidly concentrated until it reaches saturation when crystals will be formed. Furthermore a vacuum is drawn on the condenser so that the pressure within the condenser is approximately zero absolute. The loss of energy consequent upon causing condensation to take place under pressure is thus avoided. As the brine passes through the surface condenser, it is heated and then pumped to pipe 22 from which it is forced through the arms 24 and through the spray nozzles 23 in the form of a mist, where rapid evaporation takes place before the liquids reach the level of the liquid in the tank 26. It will be appreciated that this rapid evaporation, due to the enormous quantities of heat units that the brine absorbs from the steam, takes place far below the boiling points of the liquids and at atmospheric pressure.

In a power plant which is associated with the tank described, approximately 230,000 feet of gas per hour produces 160,000 pounds of steam and 10,000 k. w. of power. Of the total of 230,000,000 B. t. u.'s generated in the furnaces 36,000,000 are transformed into power; 34,000,000 are lost by radiation, etc., and 160,000,000 B. t. u.'s are dissipated in the spray pond at considerable expense, the last B. t. u.'s being otherwise dissipated to the atmosphere in the spray pond for the concentration of the salt brines and from which it will be noted that an enormous saving of energy is had. This latent heat which is ordinarily wasted, is utilized in the manufacture of salt or for the concentration of brines which are obtained in large quantities from any source, but which are largely obtained in the oil regions from the salt water which is pumped with the oil in the oil wells.

This brine is collected and then carried to the spray pond or tank 26 and contains sodium chloride, magnesium and calcium chlorides. When the concentration of the brine becomes sufficient, crystals of sodium chloride form and are removed by the drag scrapers 63 and 73 which are operated simultaneously.

After the bittern reaches a concentration of about 40% magnesium and calcium chloride, all salt has been deposited and the bittern is removed for further treatment by standard methods to separate the magnesium from the calcium.

By properly regulating the rate of flow of a fresh charge of brine through pipe 44 to the discharge pipe 34 not only the level of the liquid in the tank 26 may be maintained constant for controlling the size of the crystals, but the accumulation of crystals in the discharge line pipe 34 and the return pipe 21 will be prevented. By varying the level of the brine in the tank the size of the crystals is controlled since a higher level of brine permits the crystals to travel a greater distance through the brine with a consequent enlargement of the crystals and vice versa.

I am aware that many changes may be made and numerous details of construction may be varied through a wide range without departing from the principals of this invention and I, therefore, do not purpose limiting the patent granted hereon otherwise than necessitated by the prior art.

I claim as my invention:

1. In an apparatus for concentrating salt brines, an open tank, a support running longitudinally of the tank and projecting thereabove, an inlet pipe carried by the upper end of the support and provided with a plurality of spray nozzles for creating a brine mist over the tank, a condenser having a cooling jacket, a pipe connecting the cooling jacket of the condenser with the first mentioned pipe, a discharge pipe running longitudinally of the tank and disposed below the first mentioned pipe, a return conduit connected with the cooling jacket of the condenser and with the discharge pipe, a supply pipe for solutions having an open end for discharging into the return conduit, said supply pipe being connected with a source of brine, and a pump for causing withdrawal of the brine from the tank and for forcing the brine from the tank to the condenser, and valves selectively operable to cause said pump to return the brine to the first mentioned pipe and the spray nozzles.

2. In an apparatus for concentrating salt brines, a tank, an inlet pipe supported above the open end of the tank and provided with a plurality of spray nozzles for creating a brine mist over the tank, means for heating the brine before it enters the spray nozzles, a discharge pipe running longitudinally of the tank and disposed below the first mentioned pipe, said discharge conduit having one end open and the other end closed and provided with passages for the admission of brine from the tank, a return conduit projecting into the tank and having an open end connected with the open end of the discharge conduit, a feed pipe for fresh brine having a nozzle located between the open end of the discharge pipe and the return conduit and directed towards the open end of the return conduit, and a pump for forcing fresh brine of less concentration into the tank, a pipe in communication with the return conduit and with a supply of water and connected with a pump whereby fresh water may be forced into the tank and into the return conduit.

3. In an apparatus for concentrating salt brines, a tank, an inlet pipe supported above the open end of the tank and provided with a plurality of spray nozzles for creating a brine mist over the tank, means for heating the brine before it enters the spray nozzles, a discharge pipe running longitudinally of the tank and disposed below the first mentioned pipe, said discharge conduit having one end open and the other end closed and provided with passages for the admission of brine from the tank, a return conduit projecting into the tank and having an open end spaced from the open end of the discharge conduit, a feed pipe for fresh brine having a nozzle located between the open end of the discharge pipe and the return conduit and directed towards the open end of the return conduit, and a pump for forcing fresh brine of less concentration into the tank, a check valve in the return conduit to permit the flow of brine from the tank but to prevent the return of the brine to said tank, a pipe connecting the pipe for supplying fresh brine with the return conduit at one side of the check valve, a pipe connected with a supply of water and likewise connected with the return conduit and with the pump, valves for controlling the fresh water supply to the conduit and also the supply of fresh brine to the conduit whereby either fresh water or brine may be supplied or both simultaneously.

4. In an apparatus for concentrating solutions, a tank having the upper open end exposed to the atmosphere, a pipe supported above the tank and provided with a plurality of spray nozzles, a pipe for supplying the nozzles with a solution to be concentrated, a plurality of frames disposed at an angle between the nozzles and the tank, said frames being each provided with a plurality of movable slats, means for variably adjusting the angularity of the slats to check the fall of the brine sprayed from the nozzles whereby the size of crystals formed by concentration of the brine will be varied.

5. In an apparatus for concentrating brines, a tank for containing a body of brine, means mounted above said tank for spraying brine and adjustable members disposed between said spraying means and tank to intercept the fall of the sprayed brine.

6. In an apparatus for concentrating brines, a tank for containing a body of brine, nozzles mounted above said tank for spraying brine and movable baffles disposed between said nozzles and tank to intercept the fall of the sprayed brine and means for varying the angular positions of said baffles to vary the path of the falling brine.

In testimony whereof I have hereunto subscribed my name at Washington, District of Columbia.

OTTO V. MARTIN.